United States Patent [19]

Christman

[11] 4,207,174

[45] Jun. 10, 1980

[54] LIQUID-LIQUID EXTRACTION APPARATUS AND PROCESS

[75] Inventor: William J. Christman, Barrington, Ill.

[73] Assignee: UOP Inc., Des Plaines, Ill.

[21] Appl. No.: 934,243

[22] Filed: Aug. 16, 1978

[51] Int. Cl.² .................... C10G 21/00; C10G 19/02
[52] U.S. Cl. .................................. 208/226; 196/14.52; 208/236; 208/317
[58] Field of Search ............... 208/317, 236, 325, 226; 196/14.52

[56] References Cited

U.S. PATENT DOCUMENTS

| 2,709,641 | 5/1955 | Gerhold | 208/317 |
| 2,752,229 | 6/1956 | Brown et al. | 208/317 |
| 3,109,870 | 11/1963 | Kuhn et al. | 208/317 |
| 3,356,459 | 12/1967 | Hann et al. | 196/14.52 |

Primary Examiner—Herbert Levine
Attorney, Agent, or Firm—James R. Hoatson, Jr.; John F. Spears, Jr.; William H. Page, II

[57] ABSTRACT

A relatively large volume horizontal liquid separation chamber is provided as an intermediate part of the downcomers used to transfer the denser liquid phase between contiguous trays of a countercurrent liquid-liquid extraction column. The downcomers also include two smaller vertical conduits which carry the liquid into and out of the opposing ends of the chamber. The downward flowing denser liquid phase is thereby subjected to a separation step within the downcomers to produce a stream of the less dense liquid released above the upper tray.

5 Claims, 3 Drawing Figures

LIQUID-LIQUID EXTRACTION APPARATUS AND PROCESS

FIELD OF THE INVENTION

The invention relates to an apparatus for the countercurrent contacting of two immiscible liquid streams to perform a purification or separation such as described in the processes found in Classes 208-311 to 208-337 or 210-21 and 210-22. These processes include the removal of mercaptans from hydrocarbon feed streams through the use of aqueous alkaline or amine solutions and the separation of aromatic hydrocarbons from non-aromatic hydrocarbons using selective solvents. The invention is specifically directed to a vertical liquid-liquid extraction column having horizontal trays and used for countercurrent operations in which the downward flow of the denser liquid phase is directed through downcomers. References concerned with similar apparatus may be found in Classes 23-267R to 23-271.

PRIOR ART

Liquid-liquid extraction is a well established process used commercially in the chemical, petroleum and petrochemical industries. It is often utilized when distillatory separation is more expensive or is impractical. A very extensive review of the art is contained in a number of articles published as pages 49-104 of *Chemical Engineering Progress*, (Vol. 62, No. 9) Sept., 1966. Instruction in the design of extraction processes and the selection of suitable equipment is provided in standard reference materials such as *The Chemical Engineers'-Handbook*, 4th Ed., McGraw-Hill Publishing Co. and Treybal, *Mass Transfer Operations*, 2d Ed., McGraw-Hill Publishing Co.

Processes for the removal of sulfur compounds, such as mercaptans, from a hydrocarbon feed stream by liquid-liquid extraction with an aqueous alkaline solution which is subsequently regenerated are described in U.S. Pat. Nos. 2,921,020 (Cl. 208-205); 2,988,500 (Cl. 208-206); 3,108,081 (Cl. 254-428); 3,260,665 (Cl. 208-206); 3,409,543 (Cl. 208-234); 3,574,093; 3,923,645 and 4,040,947 (Cl. 208-235).

One of the commonly used types of extraction apparatus comprises a vertical cylindrical vessel containing a number of horizontal liquid support trays. This type of apparatus often includes either downcomers through which the descending liquid flows or guides for the rising liquid phase. Examples of this column-type extraction apparatus are contained in U.S. Pat. Nos. 2,610,108 (Cl. 13-270.5); 2,623,813; 2,699,505 and 2,895,809.

BRIEF SUMMARY OF THE INVENTION

The invention provides a column-type multi-stage liquid-liquid extraction apparatus in which the separation of a less dense liquid from the downward flowing denser liquid is improved at each tray by a novel downcomer. The invention may be broadly characterized as a liquid-liquid extraction apparatus which comprises a cylindrical outer vessel having a vertical major axis; a plurality of horizontal perforated liquid support trays extending across the internal volume of the vessel at vertically spaced apart intervals; and a plurality of liquid downcomers connected to the liquid support trays. Each downcomer comprises a first vertical conduit which extends downward from a liquid support tray and which is operably connected to a first end of a horizontal liquid separation chamber located under the tray. This chamber has a larger cross-sectional area than the first vertical conduit and extends across the internal volume of the outer vessel to provide a large volume to allow entrained globules of the less dense liquid to separate from the main liquid stream. A second relatively small diameter vertical conduit is connected to the second end of the liquid separation chamber and extends downward to a point a short distance above the tray immediately below. Preferably a third small diameter conduit extends upward from the liquid separation chamber to a point above the liquid support tray to discharge the accumulated less dense liquid.

Another embodiment of the invention comprises a liquid-liquid extraction process wherein an upward flowing hydrocarbon feed stream is subjected to multistage countercurrent contacting with a descending solvent stream in a trayed vertical extraction column. The solvent stream is transferred downward from tray to tray in downcomers having an enclosed quiescent substantially horizontal liquid phase separation zone, and entrained globules of liquid hydrocarbons which enter the extraction column as part of the feed stream are separated from the portion of the solvent stream flowing through the downcomer within the separation zone. The thus-separated liquid hydrocarbons are vented from the phase separation zone to a point above the tray immediately above the phase separation zone through a vertical conduit extending through the tray.

Figure 1:
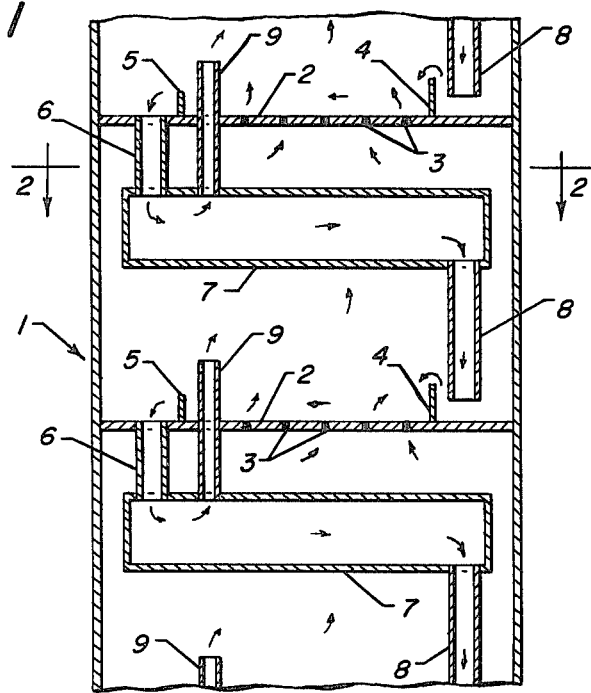
FIG. 1 is a cross-section taken along a vertical plane through the center line of a liquid-liquid extraction column in which the preferred embodiment of the invention is installed.

The structures shown in the drawings have been simplified for brevity and clarity of presentation of the inventive concept. Accordingly, various accouterments and normally utilized subsystems are not shown. These include support brackets, weep holes, manways, liquid transfer lines and distributors, valves, control systems, etc., which may be of a type customarily utilized in the art.

Referring now to FIG. 1, the central portion of a hollow cylindrical extraction vessel 1 incorporating the preferred embodiment of the invention is illustrated. This vertical vessel has a cylindrical internal volume which is divided into a number of countercurrent contacting stages by the vertically spaced horizontal liquid support trays 2. These trays have a large plurality of evenly spaced perforations 3 spread across a centrally located liquid-liquid contacting area. A continuous stream of the denser liquid phase descends through the column. This liquid stream enters the section of the apparatus shown in the Drawing from above through a vertical conduit 8 which is part of a downcomer. As illustrated, the lower open end of this conduit is preferably located at a point below the upper horizontal edge of an imperforate vertical wall 4 used as an inlet weir. The liquid stream is distributed across the upper surface of the support tray as it flows over the wall 4. At the same time, rapidly flowing less dense liquid passes upward through the perforations 3 and intimately contacts the stream of denser liquid and the extraction operation is thereby effected. The thus-contacted denser liquid leaves the upper tray by passing into the upper open end of the vertical conduit 6 through a relatively large opening in the upper surface of the tray. A second imperforate vertical wall 5 separates the contacting area of the tray from this downcomer inlet opening.

The ascending less dense liquid should pass through the perforations at a velocity sufficient to produce substantial agitation and admixing of the liquid streams since this promotes efficient extraction. An undesired result of this agitation is the entrainment of globules of the less dense liquid into the stream of denser liquid entering the downcomer. The descending two-phase downcomer liquid stream in conduit 6 flows into a horizontal liquid separation chamber 7 in which the two liquid phases may separate. The lighter material which was entrained accumulates at the top of the tubular separation chamber as a separate liquid phase, if present in a sufficient quantity, and rises through a vertical outlet conduit 9. The upper open end of this conduit is preferably elevated above the normal level of the denser liquid on the tray immediately above. A third vertical conduit 8 is connected to the other end of the liquid separation chamber at the bottom of liquid separation chamber. The denser liquid phase exits the downcomer through this conduit and begins a pass across the next lower tray.

Figure 2:
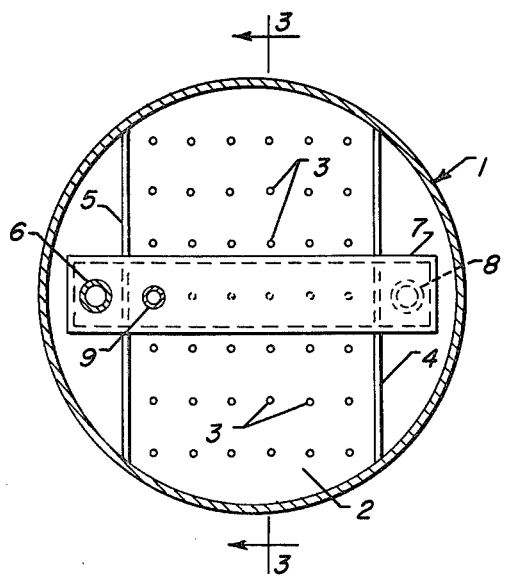
FIG. 2 is a cross-sectional view of the same column taken along line 2—2 and looking downward at the horizontal liquid separation chamber of the preferred downcomer.

FIG. 2 is the view seen looking downward at the upper liquid separation chamber 7 of FIG. 1. The manner in which this chamber extends from one lateral side of the vessel to the other may be seen in this view. The chamber is perpendicular to the vertical walls 4 and 5, which abut the inner surface of the wall of the outer vessel 1. A minimal number of representative perforations 3 are distributed across the lower tray 2. The vertical conduits 6, 8 and 9 all communicate with the internal volume of the liquid separation chamber.

Figure 3:
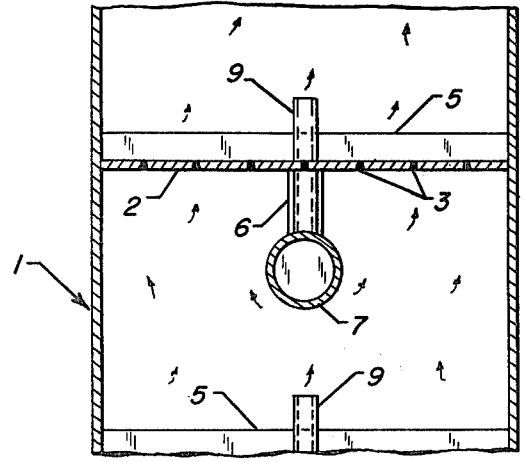
FIG. 3 is a cross-section of the same column taken along a vertical plane perpendicular to that used to generate FIG. 1.

In FIG. 3, a side view of the preferred embodiment is presented. This view is seen looking along the horizontal major axis of the liquid separation chamber 7. The two vertical conduits 6 and 9 extend upward from this chamber, with conduit 9 rising above the upper surface of the tray 2 and the horizontal upper edge of the outlet weir or wall 5. This wall and the inlet weir not shown are preferably attached to the cylindrical inner surface of the outer vessel 1 and to the upper surface of the tray.

DETAILED DESCRIPTION

Multi-stage countercurrnet liquid-liquid extraction is widely applied to perform purifications or separations in the food, chemical, petroleum and petrochemical industries. In these multi-stage operations, the two basic steps of the extraction process, contacting and separation, are each repeated several times in sequence. This may be done in a wide variety of equipment. One type that is often used is the vertical extraction column. The denser liquid stream is fed into an upper portion of the column, often at the top, and travels downward. The less dense liquid is fed into the bottom of the column and travels upward. Either liquid may be the feed stream or the solvent stream. These columns may be designed to have the denser liquid phase pass downward through a large plurality of perforations in the contacting area of the horizontal trays which extend across the internal volume of the column. In this arrangement, the less dense phase flows across the bottom surface of the trays and into conduits which guide it to the next tray above until it eventually reaches the top of the column. However, in the subject invention, the denser liquid phase is retained upon the upper surface of the liquid support trays and flows through the downcomers while the less dense liquid flows upward through the perforations in the trays. The subject invention is directed to this specific type of countercurrent multi-stage extraction wherein the denser liquid stream flows through downcomers.

One of the basic considerations in the design of a liquid-liquid extraction column is the adequacy of the contacting performed at each stage or tray in the column. Certain well established guidelines or experimental data are therefore utilized to design a column having a free area or porosity which provides which has been found to be an effective liquid velocity through the perforations on the tray. However, the resultant agitation of the liquid phases also causes small particles or globules of each liquid phase to become dispersed into the other liquid phase at the contacting point. It is not desirable to carry these smaller particles along with main liquid flow. It is therefore desired that the contacted liquid phases be maintained at quiescent conditions conducive to the separation of the two liquid phases for a time sufficient to allow them to completely separate before the phases are passed on to their next respective contacting stage. This separation step begins while the denser liquid stream is traveling from the contacting area to the inlet of the downcomer.

The time required for the adequate separation of any two liquids will depend to some extent on the identity of the two liquids. For instance, an aqueous solution of an alkaline metal hydroxide such as sodium hydroxide, commonly referred to as caustic, and a light hydrocarbon will normally settle from a vigorous mixing in about seven seconds. In comparison, it requires about 70 seconds to effect an adequate separation after a similar mixing of an amine solution and a light hydrocarbon.

It is common practice to utilize a cylindrical downcomer to remove the denser liquid phase from the surface of an extraction tray. The opening at the top of this conduit is normally separated from the contacting area of the tray by a vertical weir following a chord across the circumference of the tray. The outlet conduit is customarily evenly spaced between the circular outer edge of the tray and this weir or, if no weir is used, the point which marks the end of the contacting area of the tray. Also by standard design, the space allowed on each side of the outlet conduit is about at least three inches and may equal the diameter of the conduit. Therefore a chordal imperforate zone having a width at least six inches greater than the diameter of the outlet conduit is normally provided in a chordal area on the edge of the tray. This area and an approximately equal area on the opposite side of the tray are excluded from the contacting area of the tray and therefore are not available for performing the contacting step of the extraction process.

It is desired that the liquid phase entering the downcomer has a residence time within the downcomer conduit equal to or exceeding the time necessary for the two liquid phases which are being contacted to separate. Therefore, in the case of contacting an amine solution and a light hydrocarbon, it is desired that a residence time in excess of 70 seconds is provided for the denser material in the downcomer. An exceedingly long residence time such as this dictates the use of very large diameter conduits to accommodate a large volume of liquid. The result is that a very large area of the tray surrounding the mouth of the downcomer is not available for utilization in the extraction step. For example, if a 12-inch vertical conduit is required to provide an adequate residence time, then the perforations in the tray would be located no closer than 1½ feet from the edge of the tray on the outlet side of the tray.

It is an objective of the subject invention to provide an apparatus for the countercurrent multi-stage contacting of two immiscible liquids. It is another objective of the invention to provide a downcomer structure for use in a multi-stage liquid extraction column. It is a further objective of the invention to minimize the inactive or dead areas required on the surface of trays used in liquid-liquid extraction columns while simultaneously effecting adequate separation of the two liquid phases at each stage in the contacting operation. A further objective is to provide a multi-stage countercurrent liquid-liquid extraction process provided good separation of the liquid phases between contacting steps.

The subject apparatus is contained within a cylindrical outer vessel constructed in accordance with the applicable standards or codes for vessel design. The outer vessel and the components located inside it are preferably constructed of a suitable metal, such as carbon steel or stainless steel. Other metals or reinforced plastics may also be used. The cylinder is closed at the top and the bottom and is liquid-tight with the exception of the required liquid transfer lines. A plurality of substantially horizontal liquid support trays are vertically spaced apart within the internal volume of the vessel. The design and vertical spacing of the trays is determined for each particular service in accordance with well known design procedures. For example, for the extraction of mercaptans from liquid hydrocarbons, the trays are normally spaced about 4 to 7 feet apart, which smaller distances down to about 18 inches being usable in other applications. Each tray has a "free area" equal to the total open area of all the perforations located in the contacting area of the tray. The perforations should be from about ⅛ to ⅜-inch in diameter, and should be spread across the tray in a manner which assures uniform contact of the rising liquid phase with the liquid phase traversing the tray. Preferably the perforations are located in three or more rows perpendicular to the flow of this liquid phase. From three to about twenty or more tray may be utilized in the apparatus. At least two liquid transfer conduits communicate with the internal volume of the vessel at points above and below the trays to provide inlets for the feed and solvent streams and outlets for the extract and raffinate streams.

The number and total cross-sectional area of the perforations in the contacting area of the tray are probably the most important considerations in obtaining an efficient extraction since they determine the velocity through each individual perforation. Recommended velocities are available in the literature for a large number of systems. If no published value is available, an optimum velocity should be determined experimentally. The trays are preferably a perforated or sieve-type tray rather than a bubble cap tray. They should be substantially horizontal and extend across the internal volume of the column. As used herein, the term "substantially horizontal" is intended to indicate the relevant surface or member has an inclination less than 5° from horizontal.

The vessel and the trays may be characterized as having two lateral halves or sides, with the inlet and outlet ends of the downcomers being on opposite sides of any specific tray. These two lateral halves are divided from each other by a vertical plane which passes through the vertical central axis of the outer vessel, and therefore through the middle of each tray, and which is perpendicular to a horizontal line drawn between this central axis and the middle of the upper opening of the downcomer removing liquid from the relevant tray. The vertical plane is parallel to the inlet and outlet weirs located on the trays. Preferably, the outlets of all the downcomers within the vessel are vertically aligned with each other. The denser liquid therefore preferably flows into all the downcomers in the first lateral half of a vessel and is transported to the second lateral side or half of the vessel by the downcomers before being discharged upon the surface of the lower tray.

According to the inventive concept, each downcomer is constructed with an inlet or first vertical conduit which is attached to the downcomer inlet of the tray and which carries the descending liquid phase into a substantially horizontal liquid separation zone or chamber. This first vertical conduit is preferably relatively short and attached to the upper surface of the liquid separation chamber at or near the end of a liquid separation chamber. The liquid separation chamber is preferably an enclosed tubular conduit having a cross-sectional area at least twice as large as the cross-sectional area of the vertical conduit which removes the entering liquid from the tray above. More preferably, the cross-sectional area of the liquid separation chamber is at least five times greater than the cross-sectional area of the vertical conduit.

The first or inlet vertical conduit is attached at or near a first end of the liquid separation chamber, and a longer second or outlet vertical conduit is attached to the opposing or opposite second end of the liquid separation chamber. The two vertical conduits are preferably connected to the liquid separation chamber at these distant points to maximize the time which liquid must reside within the chamber before leaving it, thereby increasing the separation efficiency of the chamber. One or both of the vertical conduits may be located inward from the end of the liquid separation chamber, but they are to be on opposite lateral halves of the vessel. The second vertical conduit preferably communicates with the internal volume of the chamber through an opening in the bottom of the chamber to thereby facilitate the removal of only the denser liquid phase contained within the chamber.

Preferably, the chamber is substantially horizontal. It may, however, be tilted slightly such that the inlet end at which the first vertical conduit is connected is at a slightly higher elevation. It is also preferred that the liquid separation chamber is located closer to the upper of the two trays which it is between. This minimizes interference with the extraction and separation steps being performed at the tray immediately below. It should, however, also not interfere with flow through the tray immediately above and is preferably located at least 20 cm. below this tray. The three conduits forming the downcomer may be assembled in the manner illustrated in the drawing and may be fabricated from standard size components. For instance, if the internal diameter of the outer vessel 1 is about 3.5 feet, then the vertical conduits 6 and 8 could be fabricated from 3-inch pipe and the liquid separation chamber 7 could be fabricated from 8-inch pipe. It is preferred that the internal length of the liquid separation chamber, as measured along its horizontal major axis, is greater than three-quarters of the diameter of the cylindrical internal volume of the outer vessel of the column.

Preferably the liquid separation chamber is straight and has an internal length to diameter ratio above 3:1. However, if the outer vertical vessel has an inner diameter less than about 1.3 meters, the chamber should be curved to allow its passage through the manways which have to be centrally located in columns of such small diameter. Flow stabilizing vanes and coalescing means such as mesh blankets or screens may be provided near the inlet end of the chamber.

The second vertical conduit, which carries the descending downcomer liquid stream out of the liquid separation chamber, preferably ends at a point which is a short distance above the upper surface of the next lower tray and which is a discreet distance inward from the inner surface of the outer wall of the outer vessel. This is shown in the drawing. It is preferred that the lower open end of this conduit is located below the upper horizontal edge of a vertical wall which is attached to the surface of the tray to form a liquid receiving compartment on the inlet lateral half of the tray. The lower end of the conduit is therefore at a greater radial distance from the vertical central axis of the column than the wall.

The less dense liquid which separates out in the liquid separation chamber must be allowed to exit the chamber. This lighter phase may travel upward through the inlet vertical conduit if this conduit is of sufficient size and if the downward flow of liquid through the conduit is not excessive. However, according to the inventive concept, an alternative easily traveled flow path is provided for this lighter phase. This alternative flow path preferably comprises a third vertical straight conduit which communicates with the upper portion of the internal volume of the liquid separation chamber and extends upward through the liquid support tray located immediately above. This third vertical conduit may have a smaller cross-sectional area than the other vertical conduits. It should have an upper open end which is located at a point above the expected maximum normal level of the denser liquid phase on the liquid support tray but below the second tray above the separation chamber. The upper end of this conduit is therefore preferably above the horizontal edge of the vertical wall on the inlet side of the tray.

Those skilled in the art will recognize that the embodiments of the invention shown in the drawing and heretofore described are subject to variation in several ways. For instance, the first and second vertical conduits may have a different shape, such as rectangular or chordal, and the liquid separation chamber may have a square or rectangular cross-section. The third vertical conduit utilized to allow the escape of the separated lighter material may extend to a higher point than shown and may be located near the outlet or second end of the liquid separation chamber. All three vertical conduits preferably have a vertical central axis, but they may be inclined or slightly curved if desired. Although the use of simple perforations to form a sieve-type contacting tray is preferred, other structures designed to promote or increase the effectiveness of the contacting on the surface of the tray may be utilized instead. These include various adjustable or self-adjusting variable opening devices and bubble-type contactors. The structure of the two vertical walls 4 and 5 may also differ from that shown in the Drawing. For instance, they may be perforated or have vanes attached to them to more evenly distribute the flow of the denser liquid across the upper surface of the tray. It is also possible to delete these two vertical walls entirely. However, it is preferred that they be present on the tray in approximately the same form as is shown in the Drawing.

The preferred embodiment of the invention may be characterized as a multi-stage liquid-liquid extraction column having a plurality of liquid downcomers operably connected to the lower surface of horizontal liquid support trays which extend across the internal volume of the column at vertically spaced intervals, with the individual downcomers comprising a first vertical conduit having a first cross-sectional area and connected to an opening through a liquid support tray located in a first lateral half of the extraction column, the first vertical conduit extending downward and terminating at a lower end located below the tray; a cylindrical liquid separation chamber having a first and a second end, an internal volume, a horizontal major axis and a cross-sectional area at least five times as large as the cross-sectional area of the first vertical conduit, the liquid separation chamber extending across the internal volume of the extraction column with the lower end of the first vertical conduit being connected to the first end of the liquid separation chamber, and with the first end of the liquid separation chamber being located in the first lateral half of the extraction column and the second end of the liquid separation chamber being located in the second lateral half of the extraction column; a second vertical conduit having an upper end connected to the second end of said liquid separation chamber and an open lower end located at a point in the second lateral half of the extraction column and above a vertically contiguous lower second tray, the second vertical conduit having a vertical major axis and a cross-sectional area which is smaller than the cross-sectional area of the liquid separation chamber; and a third vertical conduit communicating with the internal volume of the liquid separation chamber through an opening in an upper surface of the liquid separation chamber and extending upward through the first liquid support tray to an upper open end located at a point above this tray.

One of the more widely used extraction processes to which the present invention may be applied is the separation of aromatic hydrocarbons and non-aromatic hydrocarbons such as naphthenes and paraffins. This may be for the purpose of obtaining relatively pure portions of either class of hydrocarbon,. This operation is often found in conjunction with fractionation and extractive distillation step. An example of this is the process described in U.S. Pat. No. 3,844,902. The feed stream will preferably have a limited boiling point range which limits the hydrocarbons to those having from about 6 to 20 carbon atoms per molecule and more preferably from about 6 to 12 carbon atoms. Suitable feed streams include a debutanized reactor effluent from a catalytic reforming unit and a liquid by-product from a pyrolysis gasoline unit which has been hydrotreated for the saturation of olefins and diolefins.

At the heart of the extraction process, is the use of a solvent which is selective for the preselected chemical compound which is to be removed from the feed stream. Besides having this property of selectivity, solvent material must be substantialy immiscible with the feed stream and also differ in density. There are available and known to those skilled in the art a wide variety of materials which meet these general requirements. For instance, aromatic hydrocarbons may be extracted with diglycol amine, diethylene glycol, dipropylene glycol, tetraethylene glycol or n-formyl morphaline, etc. These chemicals are usually mixed with water to form the actual solvent solution. More detailed information on these solvents is contained in the articles appearing at page 91 of the March, 1973 edition of *Hydrocarbon Processing* and at page 141 of the April, 1972 edition.

A specifically preferred solvent for the separation of aromatics and non-aromatics is one of the sulfolane-type as described in U.S. Pat. No. 3,652,452.

A sulfolane-type solvent may be characterized as having a five-membered ring structure containing one sulfur atom and four carbon atoms with two oxygen atoms bonded to the sulfur atom. Preferably, two hydrogen atoms are bonded to each carbon atom. A specific example of a sulfolane-type solvent is tetrahydrothiophene 1,1,dioxide. It is specifically preferred that the solvent contains about 0.5 to 5.0 wt.% water. The closely related solvents 2-sulfolene and 3-sulfolene may also be used. Yet another family of suitable compounds are the sultones described in U.S. Pat. No. 3,723,303. The feed streams which are contacted with these solvents may contain aromatic and non-aromatic hydrocarbons having from six to nine or more carbon atoms per molecule.

Adequate extraction is obtained through the use of multi-stage countercurrent contacting performed at suitable extraction conditions. When utilizing a sulfolane-type solvent, these conditions include a pressure from atmospheric to about 500 psig., preferably 50 to 150 psig., and a temperature of from about 25° C. to about 200° C., preferably about 80° C. to about 150° C. These conditions are often set by very practical considerations. For instance, the pressure must be sufficient to prevent either liquid phase from vaporizing and is often determined by an upstream or downstream unit on which the pressure in the extraction zone is allowed to "float". Elevated temperatures normally increase the extraction capacity of the solvent but decrease the selectivity such that these effects must be balanced. Solvent quantities should be sufficient to dissolve substantially all the aromatic hydrocarbons present in the extraction zone feed stream. Preferred are solvent to feed ratios, by volume, of about 2:1 to about 10:1. These factors are well developed in the art and are dependent on particular situations.

The process embodiment of the invention may be characterized as a liquid-liquid extraction process which comprises the steps of passing a feed stream comprising normally liquid hydrocarbons into the bottom of a vertical trayed extraction column operated at extraction conditions and upward through the extraction column, with the feed stream passing upward through a plurality of passageways distributed across the surface of the trays located within the extraction column; passing a solvent stream into an upper portion of the extraction column and downward through the extraction column, with the solvent stream flowing across the upper surface of trays located within the extraction column and being directed downward from tray to tray through a plurality of downcomers, including a first downcomer, as a downcomer liquid stream and effecting the contacting of the solvent stream and the feed stream; passing the downcomer liquid stream flowing through the first downcomer through a quiescent substantially horizontal enclosed liquid phase separation zone which forms a portion of the first downcomer and is located within the extraction column, effecting the phase separation of entrained liquid hydrocarbons which enter the extraction column as part of the feed stream from the downcomer liquid stream within the liquid phase separation zone, venting the thus-separated liquid hydrocarbons upward through the tray located immediately above the first downcomer by passage through a vertical conduit extending through said tray immediately above the first downcomer, and thereby forming a purified downcomer stream which is discharged downward from the liquid-phase separation zone to a tray located immediately below the first downcomer; withdrawing a reaffinate stream from the top of the extraction column; and withdrawing an extract stream from the bottom of the column.

The raffinate stream comprises the unextracted or remaining portion of the feed stream, and the extract stream comprises the solvent stream plus the extracted portion of the feed stream. The raffinate stream may have a small amount of the solvent dissolved in it. In some processes, it is customary to refer to the extract stream as the rich solvent stream.

The subject invention may also be used for the extraction of mercaptans from a hydrocarbon feed stream with an alkaline solution as is widely practiced in the petroleum industry. This alkaline solution is then effectively regenerated by the catalytically promoted oxidation of the extractive mercaptans to disulfides which are separated by decantation. The process may be performed with any alkaline reagent which is capable of extracting mercaptans from the feed stream at practical operating conditions and which may be regenerated in the manner described. A preferred reagent comprises an aqueous solution of an alkaline metal hydroxide, such as sodium hydroxide or potassium hydroxide. Sodium hydroxide may be used in concentrations of from 1–50 wt.%, with a preferred concentration range being from about 5 to about 25 wt.%. Optionally, there may be added an agent to increase the solubility of mercaptans in the solution, typically methanol or ethanol, although others such as a phenol, cresol or butyric acid may be used.

Hydrocarbons which may be treated for mercaptan removal in this manner vary from propane-butane mixtures to the middle distillates. Included in this grouping of feed streams are streams derived from fluidized catalytic cracking plant gas concentration units, natural or cracked gasolines, jet fuels, fuel oils and kerosenes and blends of these. This process may also be used to remove mercaptans from many solvents, alcohols, aldehydes, etc. With the exception of some light $C_3$ or $C_4$ compounds, these materials may be classified as being normally liquid hydrocarbonaceous compounds having boiling points under about 345° C. as determined by the standard ASTM distillation methods. As used herein, the term "normally liquid" is intended to specify a substance which is a liquid at standard conditions (60° F. and 1 atm absolute). The extraction conditions employed for removing mercaptans may vary greatly depending on such factors as the nature of the hydrocarbon stream being treated and its mercaptan content. In general, the extraction may be performed at an ambient temperature and a pressure sufficient to insure liquid state operation. The pressure may range up to 68 atm gauge or more, but a pressure in the range from about 3.5 atm gauge to about 10.0 atm gauge is preferred. The temperature in the extraction zone is confined in the range of 16° C. to about 121° C., preferably from 25° C. to 50° C. The ratio of volume of the alkaline solution required per volume of the feed stream will vary depending on the mercaptan content of the feed stream. The flow rate of the alkaline solution may be from about 1 to about 100% of the flow rate of the hydrocarbon stream. Normally, the rate will equal about 2 to 3% of an LPG stream and up to about 20% of a $C_5$ or light straight run gasoline. Optimum extraction in this liquid system is obtained with a velocity through sieve-type perforations of from about 5 to about 10 ft/sec. Further details on this process may be obtained in the previously referred to U.S. Pat. Nos. 2,921,020; 2,988,500; 3,108,081; 3,260,665; 3,923,645 and 4,040,947.

The invention may also be applied in a process for removing acid gases, such as hydrogen sulfide, from liquid phase hydrocarbon streams. This well developed process is widely used in petroleum refining, with aqueous amine solutions being the preferred solvents. Diglycolamine at concentrations ranging from about 50 to 70 wt.% or monoethanolamine at concentrations ranging from about 10 to about 30 wt.% may be used. It is conventional to limit the concentration of $H_2S$ in the $H_2S$-rich monoethanolamine to less than about 0.35 to 0.4 moles of $H_2S$ per mole of MEA. A positive pressure sufficient to maintain liquid phase conditions and preferably above 1 atm gauge is maintained in the extraction column. The use of an average temperature below 38° C. is preferred during the extraction process, but the temperature may range from about 16° C. to about 65° C. The rich solvent is regenerated in a stripping column at an elevated temperature in a customary manner, with a temperature in the range of 115° C. to 150° C. normally being sufficient.

I claim as my invention:

1. A liquid-liquid extraction process which comprises the steps of:
   (a) passing a feed stream comprising normally liquid hydrocarbons into the bottom of a vertical trayed extraction column operated at extraction conditions and upward through the extraction column, with the feed stream passing upward through a plurality of passageways distributed across the surface of the trays located within the extraction column;
   (b) passing a solvent stream into an upper portion of the extraction column and downward through the extraction column, with the solvent stream flowing across the upper surface of trays located within the extraction column and being directed downward from tray to tray through a plurality of downcomers, including a first downcomer, as a downcomer liquid stream and effecting the contacting of the solvent stream and the feed stream;
   (c) passing the downcomer liquid stream flowing across the upper surface of said trays through the first downcomer and then through a quiescent substantially horizontal enclosed liquid phase separation zone which forms a portion of and is of larger cross-sectional area than the first downcomer and is located within the extraction column, effecting the phase separation of entrained liquid hydrocarbons which enter the extraction column as part of the feed stream from the downcomer liquid stream within the liquid phase separation zone, venting the thus-separated liquid hydrocarbons upward through the tray located immediately above the first downcomer by passage through a vertical conduit extending through said tray immediately above the first downcomer, and thereby forming a purified downcomer stream which is discharged downward from the liquid phase separation zone through a second downcomer to a tray located immediately below the second downcomer;
   (d) withdrawing a raffinate stream from the top of the extraction column; and,
   (e) withdrawing an extract stream from the bottom of the column.

2. The process of claim 1 further characterized in that the feed stream comprises hydrogen sulfide and the solvent stream comprises an aqueous amine solution which is selective for mercaptans.

3. The process of claim 1 further characterized in that the feed stream comprises a mercaptan and the solvent stream comprises an aqueous solution of an alkaline metal hydroxide.

4. The process of claim 1 further characterized in that the feed stream comprises aromatic and non-aromatic hydrocarbons and in that the solvent stream is selective for aromatic hydrocarbons.

5. The process of claim 4 further characterized in that the feed stream comprises $C_6$ to $C_9$ aromatic hydrocarbons and in that the solvent is one of the sulfolane-type.

* * * * *